Jan. 15, 1924.  
J. H. KOLTS  
1,480,765  
SNAP VALVE MECHANISM  
Filed Aug. 26, 1921  
4 Sheets-Sheet 2

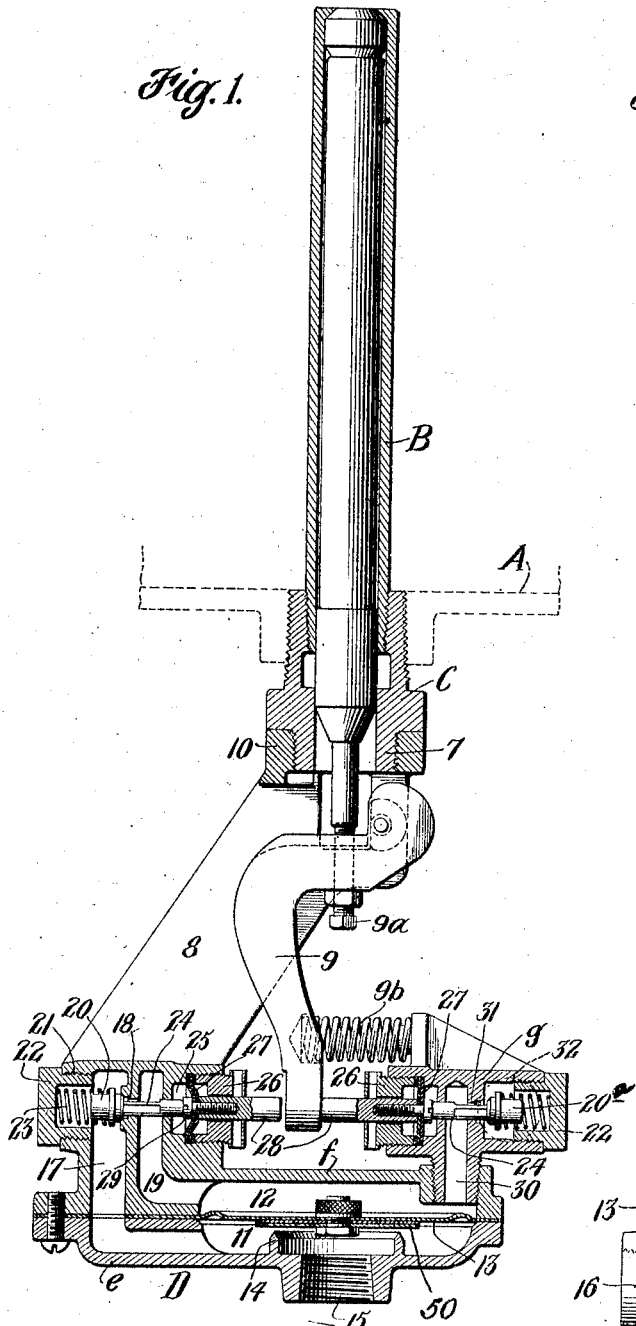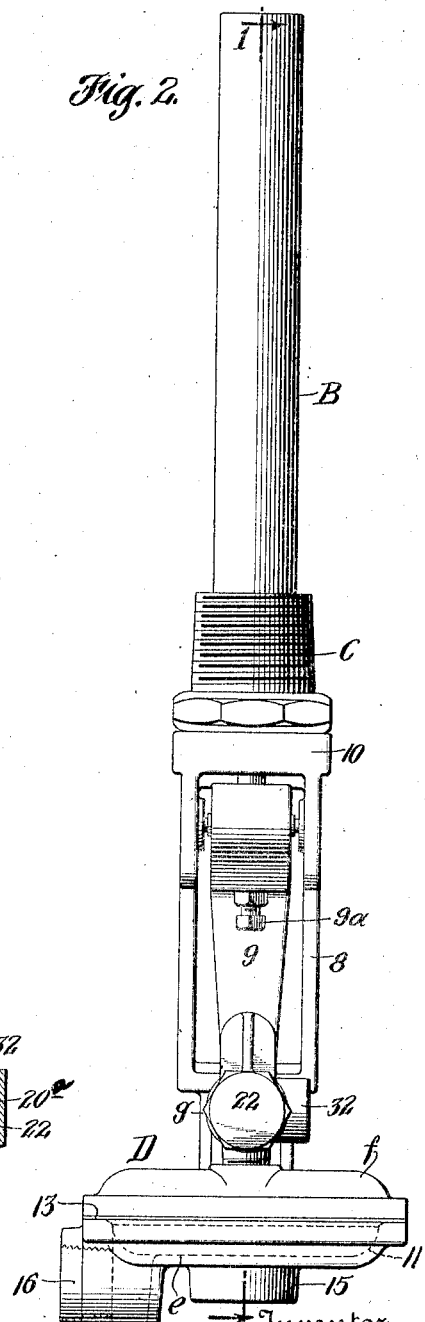

Inventor  
J. H. Kolts  
By Attorney

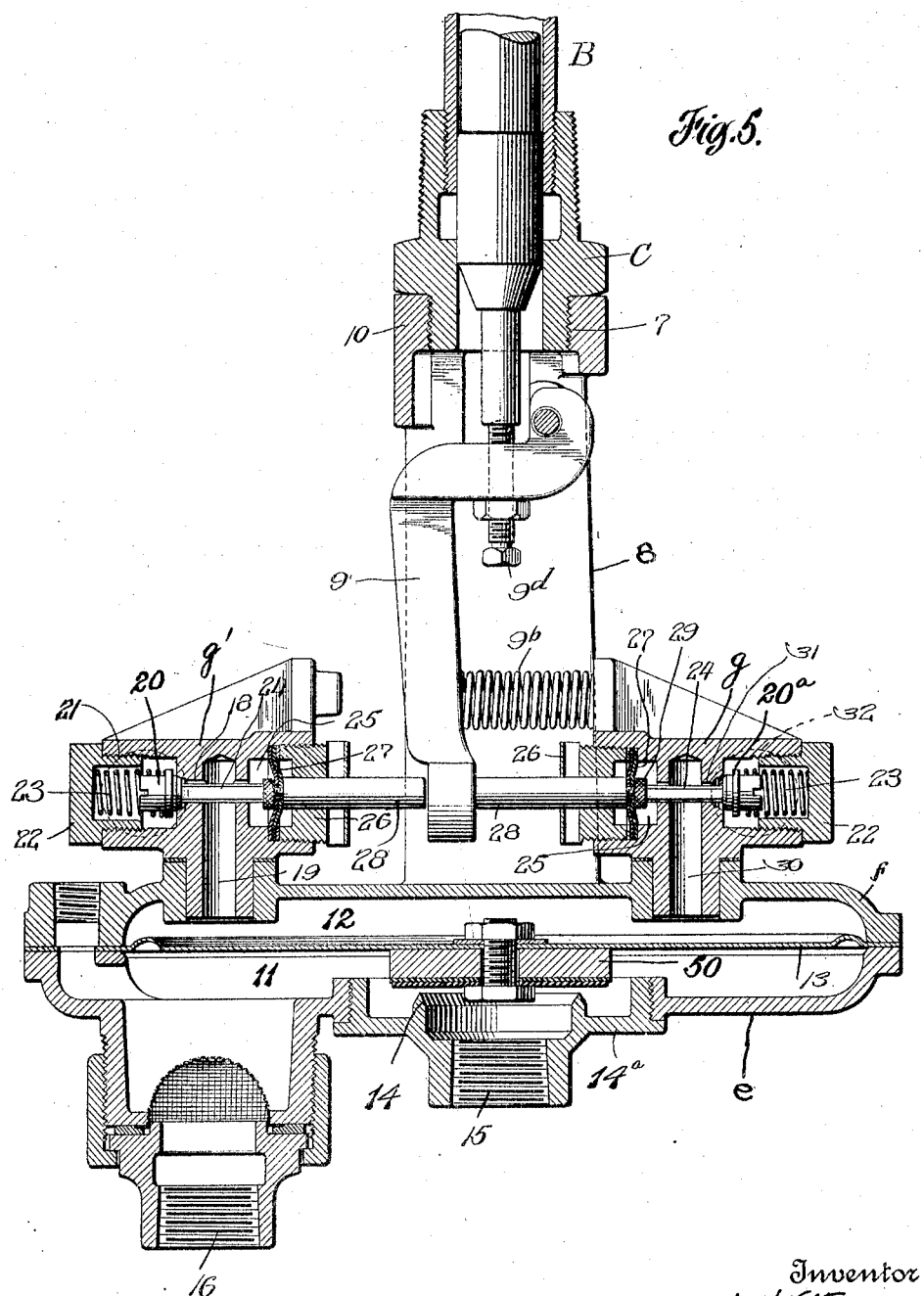

Jan. 15, 1924.  
J. H. KOLTS  
SNAP VALVE MECHANISM  
Filed Aug. 26, 1921

1,480,765

4 Sheets-Sheet 4

Patented Jan. 15, 1924.

1,480,765

UNITED STATES PATENT OFFICE.

JOHN H. KOLTS, OF CRAFTON, PENNSYLVANIA, ASSIGNOR TO PITTSBURGH WATER HEATER COMPANY, A CORPORATION OF NEW JERSEY.

SNAP-VALVE MECHANISM.

Application filed August 26, 1921. Serial No. 495,624.

*To all whom it may concern:*

Be it known that I, JOHN H. KOLTS, a citizen of the United States, residing at Crafton, in the county of Allegheny and State of Pennsylvania, have invented certain new and useful Improvements in Snap-Valve Mechanism, of which the following is a specification.

This invention relates to snap valve mechanism for hot water heating apparatus, such as storage heaters and the like, and it has for one of its primary objects the provision of a simple and inexpensive snap valve mechanism which is effective and reliable in operation and the parts of which are easy to assemble, and readily accessible for repair or renewal. Another object is to provide an improved snap valve in which leakage is practically eliminated; and the life of which is greatly extended; and which may be readily repaired or inspected without impairing the operation of the parts.

My invention further contemplates a construction in which friction or resistance to movement of the operating parts is reduced to a minimum and which is in this respect, fool proof.

Still another object is to provide an improved valve mechanism which can be readily adapted to differently arranged thermostats, such as horizontal or vertical thermostats, for example.

Figure 5:
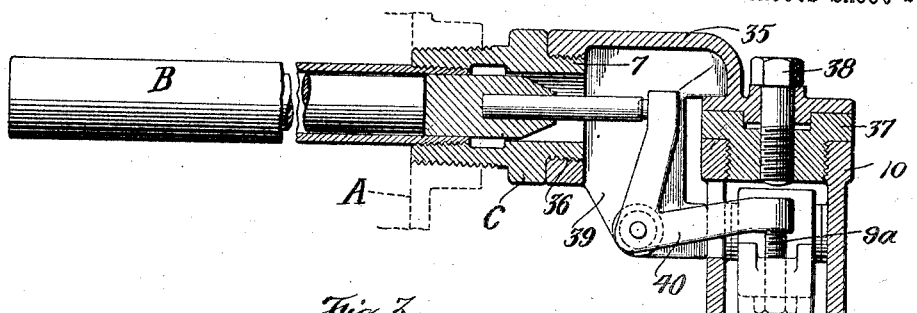
Figure 7:
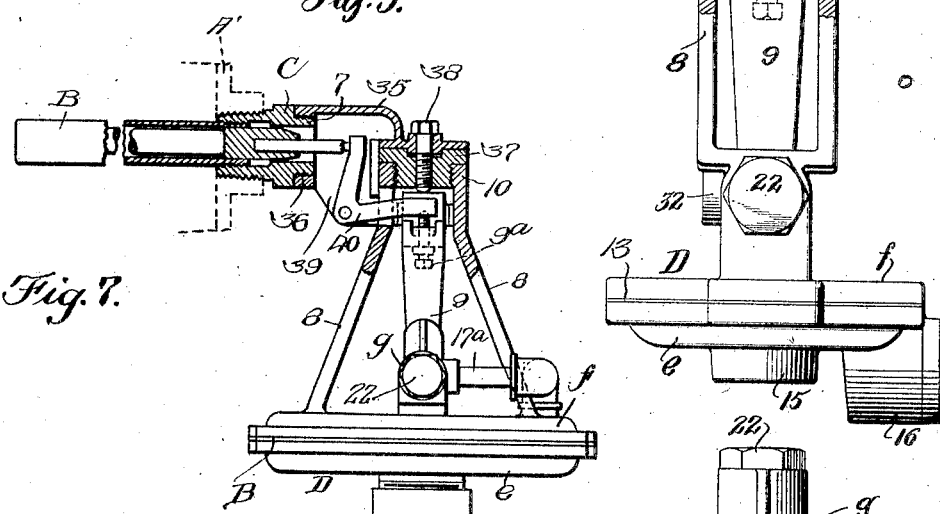
Figure 4:
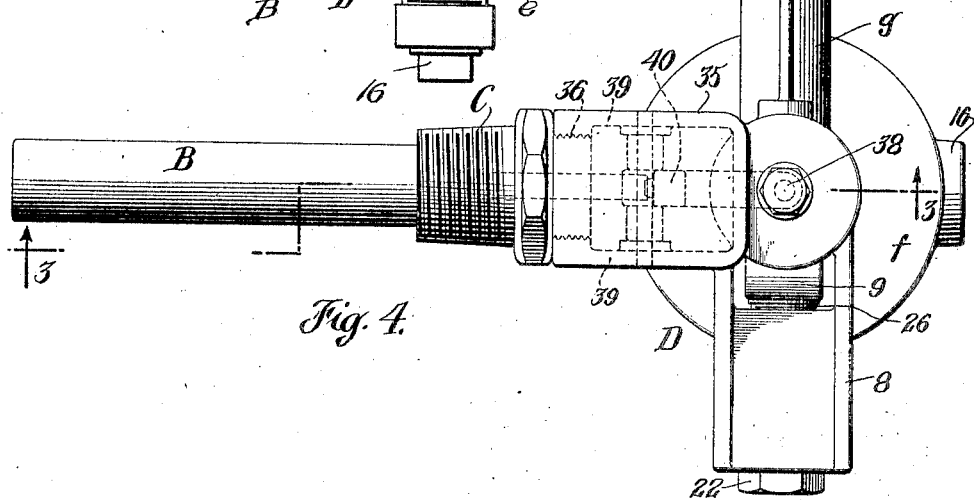
Figure 6:
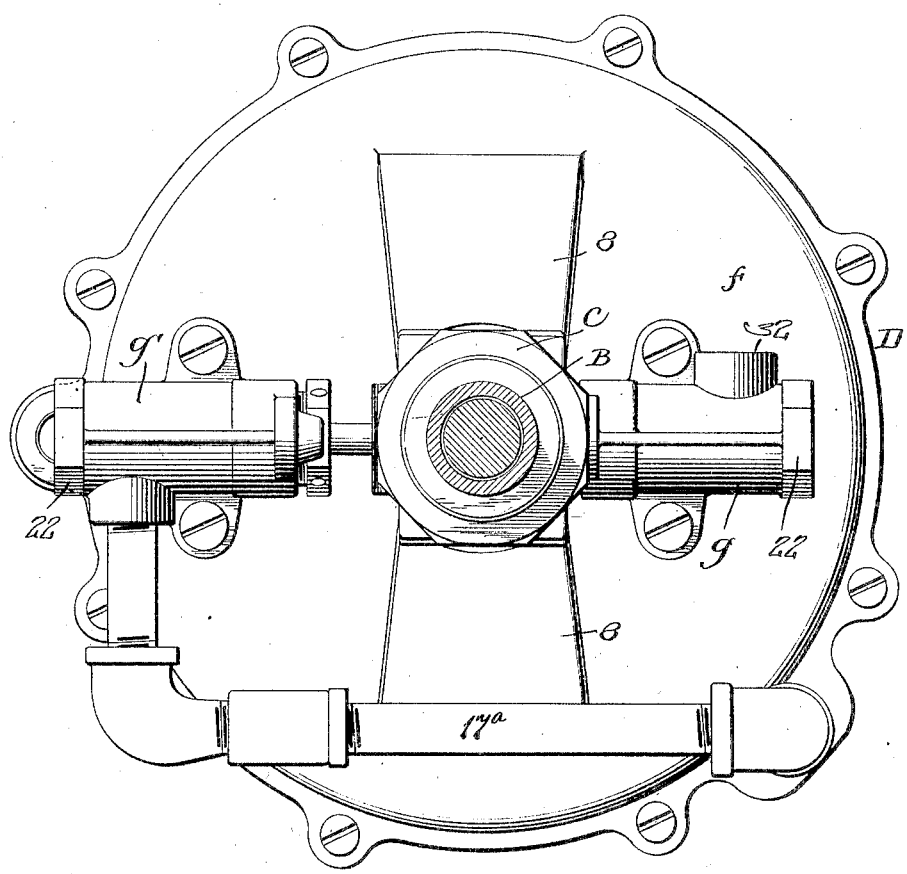

The foregoing, together with such other objects as may hereinafter appear, or are incident to my invention, I obtain by means of a construction illustrated in preferred form in the accompanying drawings, wherein:

Fig. 1 is a sectional view illustrating my improvements on the line 1—1 of Fig. 2 illustrating their application to a vertical thermostat; Fig. 2 is an end elevation of Fig. 1; Fig. 3 is a view as at right angles to Fig. 1 and from the rear of Fig. 2, partly in section, illustrating the application to a horizontal thermostat; Fig. 4 is a plan view of Fig. 3; and Figs. 5 and 6 are respectively a sectional and plan view of a modification of my invention. Fig. 7 is a view similar to Fig. 3 illustrating the snap valve mechanism of Figs. 5 and 6 applied in connection with a horizontally arranged thermostat.

Referring to Figs. 1 and 2, the reference letter A indicates the heater tank having a thermostat B secured in place by the plug C, the outer end 7 of which is externally threaded. The valve mechanism comprises the casing indicated as a whole by the reference letter D, such casing being composed of the members *e*, *f*, *g;* the member *f* having a yoke-like extension or bracket 8 adapted to receive the usual multiplying lever 9, and having its upper end 10 internally threaded to engage the threaded end 7 of the plug. The interior of the casing is divided into compartments 11 and 12 by a diaphragm valve 13, mounted and secured between the members *e* and *f* and adapted to take seat against the seat 14 surrounding the outlet 15 in the member *e*, and controlling the flow of gas from compartment 11 to the burners (not shown). Gas is admitted to the said compartment 11 through the inlet 16.

Pressure from compartment 11 enters compartment 12 through the passage 17, port 18 and passage 19, the port being controlled by the valve 20 which is inserted into the casing through the opening 21, closed by the plug 22. The valve is normally held closed by a spring 23, and its stem proper, 24 extends into the open ended diaphragm chamber 25. The chamber is closed by a plug 26 which serves to secure a diaphragm 27 carrying a second stem or tappet member 28 guided in the plug 26 in which it has a free, sliding fit. The diaphragm is secured to the member 28 by a cap screw 29 and the stem proper 24 butts against such screw. The stem 28 is virtually "packed" against leakage by the diaphragm 27 without the friction incident to ordinary methods of packing; while at the same time it is guided and exposed for endwise engagement by the lever 9 without any liability of being deflected sidewise by the lever so as to bind or become jammed.

Pressure is relieved or exhausted from the compartment 12 through passage 30, relief port 31 and outlet 32 leading to the pilot valve or some other point where the small quantity of gas thus relieved may be consumed to avoid smells. The relief port is controlled by a valve 20ª of the same construction and assembled in the same manner as that just described.

It will be noted that the valves 20 and 20ª are arranged in substantial alinement and are oppositely acting. The end of the lever 9 fits nicely between the stem members 28 so as to reduce lost motion to a minimum.

The operation is as follows: When the temperature of the water in the tank is above the standard selected (by adjustment of the set screw 9ª) the thermostat in expanding permits spring 9ᵇ to move the lever 9 to the left, closing the valve 20ª controlling the relief port 31 if such valve be open, and opening the other valve 20, controlling port 18, thereby admitting pressure to compartment 12. As soon as the pressure equalizes in the two compartments the diaphragm valve 13 snaps shut, because the drag of the outflow through the outlet 15, plus the action of gravity, is sufficient to produce an unbalanced condition resulting in a snapping shut of the valve. Where the temperature drops below the predetermined point, the thermostat contracts, and, overcoming the resistance of the spring 9ᵇ, moves the lever to the right, closing port 18 and opening relief port 31, which results in the exhaust of pressure from compartment 12 and a snapping open of the valve.

It will be observed that the diaphragms 27 prevent leakage from the compartment 12 around the valve stems and I have found the arrangement to be very advantageous for the diaphragms present a minimum of resistance to movement of the valve much less than the usual packed form of valves. The arrangement also obviates a defect of the latter type, namely in the packed type, the nuts may be easily drawn up too tight, increasing the friction to such a point as to make the valves sluggish or even inoperative. I am enabled by my construction to always ensure sensitiveness in operation.

Should it be desired to apply the valve to a horizontal thermostat, the adapter of Figs. 3 and 4 is employed with the structure of Figs. 1 and 2 or of Figs. 5 and 6, the latter as shown in Fig. 7. This adapter includes the elbow-like member 35 having one end 36 internally threaded to fit the plug C and its other end shaped to fit the plug 37 having a threaded portion corresponding to the end 7 of the plug and, therefore, adapted to fit the threaded end 10 of the bracket 8 of the valve casing D. The member 35 is secured to the plug 37 by the stud 38, and it has two clevis arms or sides 39, the ends of which abut the extension 8 and support the same. Between the arms 39 a lever 40 is pivoted, one leg of which engages the thermostat and the other the set screw 9ª, the lever cooperating to transmit the horizontal movements of the thermostat to lever 9. No alteration of the valve mechanism is thus required, save possibly the adjustment of the set screw 9ª. The advantages of this will be readily understood.

In the modification of Figs. 5 and 6, which I prefer to the construction already described, the valve seat 14 is formed separate from the casing member $e$, preferably on a closure or cap member 14ª which is threaded into an opening in the casing wall. I have found that the seat works a groove in the leather of the valve member 50 and that when the casing parts $e$, $f$, are disassembled for purposes of examination or repair, it is impossible to get them together again with the groove and seat concentric so that leakage takes place. By the construction under consideration access may be had to the valve proper by simply removing the cap 14ª and without disturbing the diaphragm; and when the cap is screwed back the valve seat and the groove in the valve will be concentric.

It will also be noted that both valves 20 and 20ª are in this instance mounted in separate casings $g$ and $g'$ threaded or otherwise secured to the main casing—an arrangement which is more simple and economical. Gas pressure is conveyed from compartment 11 to compartment 12 by the connection 17ª. The bracket 8 is also somewhat differently disposed. The operation is the same as that previously described.

In Figs. 5, 6, and 7 various parts and features corresponding to those illustrated in Figs. 1, 2, 3 and 4 are marked with the same reference characters, as a means of dispensing with merely repetitive description.

What I claim is:

1. In a heater, the combination with the thermostat and its lever, of a snap valve comprising a casing, a diaphragm dividing said casing into two compartments, one of which is provided with an inlet and outlet, and the other of which has a relief outlet, a port establishing communication between the two compartments, a valve controlling said port and a valve controlling said relief outlet, the stems of which are adapted to be engaged by the lever, means yieldingly urging said valves to closed position, and a seat adjacent the first mentioned outlet on which said diaphragm is adapted to seat upon opening of the relief outlet.

2. In a heater, the combination with the thermostat and its lever, of a snap valve comprising a casing; a diaphragm dividing said casing into two compartments, one of which is provided with an inlet and with an outlet controlled by said diaphragm, and the other of which is provided with a relief outlet; a port adapted to establish communication between the two compartments, a valve controlling said relief outlet; and a valve controlling said port, the stems of which are adapted to be engaged by said lever; and a diaphragm for each stem secured to the casing.

3. In a heater, the combination with the thermostat and its lever, of a snap valve comprising a casing; a diaphragm dividing said casing into two compartments, one of which is provided with an inlet and with an outlet controlled by said diaphragm, and the other of which is provided with a relief outlet; a port adapted to establish communication between the two compartments; a valve controlling said relief outlet and a valve controlling said port, the stems of which are adapted to be engaged by said lever; a guide for each stem mounted on the casing; and a diaphragm interposed between each guide and the casing.

4. In a heater, the combination with the thermostat and its lever, of a snap valve comprising a casing; a diaphragm dividing said casing into two compartments, one of which is provided with an inlet and with an outlet controlled by said diaphragm, and the other of which is provided with a relief outlet; a port adapted to establish communication between the two compartments; a valve controlling said relief outlet and a valve controlling said port, the stems of which are adapted to be engaged by said lever; a guide for each stem mounted on the casing; and a diaphragm interposed between each guide and the casing; said two diaphragms being subject to atmospheric pressure on one side.

5. In a heater, the combination with the thermostat and its lever, of a snap valve comprising a casing; a diaphragm dividing said casing into two compartments, one of which is provided with an inlet and with an outlet controlled by said diaphragm, and the other of which is provided with a relief outlet; a port adapted to establish communication between the two compartments; a valve controlling said relief outlet and a valve controlling said port, the stems of which are adapted to be engaged by said lever, a guide plug for each stem threaded into the casing; and a diaphragm for each stem secured by the respective plug.

6. In a heater, the combination with the thermostat and its lever, of a snap valve comprising a casing; a diaphragm dividing said casing into two compartments, one of which is provided with an inlet and with an outlet controlled by said diaphragm; a port establishing communication between the two compartments and a relief outlet from said other compartment arranged in opposite sides of the casing; valves controlling said port and relief outlet, the casing being provided with openings for the insertion of said valves and for the stems thereof; plugs threaded into the casing for closing said openings; and a diaphragm for each stem secured by the plug therefor.

7. In a heater, the combination with a thermostat and its attaching plug, and a valve casing having an extension adapted to be engaged with the plug in substantial alinement therewith and provided with a multiplying lever adapted to be operated upon by a thermostat, of an adapter adapted to be interposed between the thermostat and the casing comprising an elbow-like member adapted to be engaged with the plug and the extension and provided with a lever cooperating to transmit movement of the thermostat to the multiplying lever.

8. In a heater, the combination with a thermostat and its attaching plug, and a valve casing having an extension adapted to be engaged with the plug in substantial alinement therewith and provided with a multiplying lever adapted to be operated upon by the thermostat, of an adapter adapted to be interposed between the thermostat and the casing comprising an elbow-like member adapted to be engaged with the plug and the extension and provided with a lever cooperating to transmit movement of the thermostat to the multiplying lever, said adapter being constructed to provide support for said casing when the parts are assembled.

9. In a heater, the combination with a thermostat and its attaching plug, and a valve casing adapted to have engagement with the plug in substantial alinement therewith and provided with a multiplying lever adapted to be operated upon by the thermostat, of an adapter adapted to be interposed between the thermostat and the casing comprising an elbow-like member adapted to be engaged with the plug and the casing and provided with a lever cooperating to transmit movement of the thermostat to the multiplying lever.

10. In a heater, the combination with the thermostat and its lever, of a snap valve comprising a casing with a diaphragm dividing the same into two compartments, one provided with an inlet and an outlet and the other having a relief outlet, and a port for communication between the two compartments, a valve controlling said port and an actuating stem therefor guided and exposed for endwise engagement with said lever, and a diaphragm packing for said stem.

11. In a heater, the combination with the thermostat and its lever, of a valve mechanism comprising a main valve casing, a diaphragm therein, means for supplying gas to the casing on one side of the diaphragm, means for conveying pressure to the opposite side, a valve controlling said last means, a relief from said opposite side, a valve controlling said relief, and a casing for each of said two last valves secured to the main casing.

12. In a heater, a snap valve device comprising a casing with a diaphragm valve mounted therein, said casing having an opening in its wall for access to said valve without disturbance of the diaphragm, and a removable closure for said opening carrying a seat for said valve.

In testimony whereof, I have hereunto signed my name.

JOHN H. KOLTS.